(12) United States Patent
Chen

(10) Patent No.: US 8,047,343 B1
(45) Date of Patent: Nov. 1, 2011

(54) FLOW DAMPER FOR DRAWER

(75) Inventor: Yung-Liang Chen, Taipei Hsien (TW)

(73) Assignee: KV IP Holdings Ltd., George Town, Grand Cayman (KY)

( * ) Notice: Subject to any disclaimer, the term of this patent is extended or adjusted under 35 U.S.C. 154(b) by 265 days.

(21) Appl. No.: 12/010,408

(22) Filed: Jan. 24, 2008

(51) Int. Cl.
*F16F 9/00* (2006.01)

(52) U.S. Cl. .......... 188/322.19; 188/312; 16/56

(58) Field of Classification Search .......... 188/322.19, 188/314, 312, 303, 304; 280/275, 284; 16/54, 16/56–58, 85, 286; 312/319.1, 334.44
See application file for complete search history.

(56) References Cited

U.S. PATENT DOCUMENTS

| | | | |
|---|---|---|---|
| 2,714,429 A * | 8/1955 | Etherton | 188/281 |
| 2,853,159 A * | 9/1958 | Kuhn, Jr. | 188/314 |
| 3,086,786 A * | 4/1963 | Tuczek | 280/5.508 |
| 4,168,067 A * | 9/1979 | Wiczer | 273/127 R |
| 4,682,675 A * | 7/1987 | Eddy, Jr. | 188/266.2 |
| 6,659,241 B2 * | 12/2003 | Sendrea | 188/314 |
| 6,769,710 B1 * | 8/2004 | Lim | 280/490.1 |
| 6,892,865 B2 * | 5/2005 | van Wonderen et al. | 188/314 |
| 7,559,396 B2 * | 7/2009 | Schwindt | 180/227 |
| 7,677,347 B2 * | 3/2010 | Brawn | 180/227 |
| 7,784,890 B1 * | 8/2010 | Chen | 312/319.1 |
| 2004/0113390 A1 * | 6/2004 | Broussard, III | 280/415.1 |

* cited by examiner

*Primary Examiner* — Robert Siconolfi
*Assistant Examiner* — Mariano Sy
(74) *Attorney, Agent, or Firm* — Cook Alex Ltd.

(57) ABSTRACT

A flow damper used in an auto-close mechanism of a sliding rail assembly is disclosed to include a first flow cylinder that has coupling grooves provided at one lateral side, and a second flow cylinder that has coupling blocks provided at one side and connectable to the coupling grooves to secure the first and second flow cylinders in parallel in one of the first condition where the piston rods of the first and second flow cylinders extend in same direction and the second condition where the piston rods of the first and second flow cylinders extend in reversed directions.

6 Claims, 15 Drawing Sheets

US 8,047,343 B1

FLOW DAMPER FOR DRAWER

BACKGROUND AND SUMMARY OF THE INVENTION

The present invention relates to a damping device for use in an auto-close mechanism of a sliding rail assembly for drawer, sliding door or any other furniture and more particularly, to a flow damper for drawer, which is comprised of two hydraulic cylinders arranged in parallel in reversed directions, thereby saving much installation space and providing a relatively longer buffer stroke.

Various hydraulic and pneumatic dampers are known and intensively used in drawers, sliding doors and many other furniture. FIG. 1 shows an extended status of a conventional design of flow damper 3 for this purpose. This design of conventional flow damper has drawbacks as follows:
1. This design of flow damper has a limited buffer stroke. When a relatively longer buffer stroke is necessary, the length of the flow cylinder and the piston rod must be relatively increased. However, extending the size of the flow damper will require a relatively greater installation space in the furniture (for example, the sliding rail assembly of the drawer). Therefore, the application of this design of flow damper is limited.
2. If the furniture in which the flow damper is used requires a relatively greater damping resistance, the size of the flow damper must be relatively increased to enhance the damping.

Therefore, there is a demand for a flow damper that eliminates the aforesaid problem.

The present invention has been accomplished under the circumstances in view. It is one object of the present invention to provide a flow damper, which provides a relatively longer buffer stroke and requires less installation space.

It is another object of the present invention to provide a flow damper, which allows the user to arrange the two flow cylinders in parallel in a same direction or reversed directions to fit different application requirements.

To achieve these and other objects of the present invention, the flow damper comprises a first flow cylinder and a second flow cylinder. The first and second flow cylinders each have a cylinder body filled with a flow substance, a piston accommodated and axially slidable in the cylinder body, and a piston rod connected to the piston and extending out of one end of the cylinder body and movably forwards/backwards with the piston relative to the cylinder body. Further, the cylinder body of the first flow cylinder has at least one coupling groove disposed at one lateral side thereof; the cylinder body of the second flow cylinder has at least one coupling block disposed at one lateral side thereof and respectively connectable to the at least one coupling groove of the first flow cylinder to secure the first flow cylinder and the second flow cylinder in parallel in one of a first condition where the piston rods of the first and second flow cylinders extend in the same direction and a second condition where the piston rods of the first and second flow cylinders extend in reversed directions.

DETAILED DESCRIPTION OF THE INVENTION

Referring to FIGS. 2~5, a flow damper for use in a furniture, for example, the auto-close mechanism of a sliding rail assembly for drawer, in accordance with a first embodiment of the present invention is shown comprised of two flow cylinders 1 and 2 arranged in parallel. The flow cylinder 1 or 2 comprises a cylinder body 11 or 21 each defining a flow chamber (not shown) filled with a hydraulic fluid or gas, a piston (not shown) accommodated and axially slidable in the flow chamber inside the cylinder body 11 or 21, and a piston rod 12 or 22 connected to the piston and movably forwards/backwards with the piston relative to the cylinder body 11 or 21.

Figure 1:
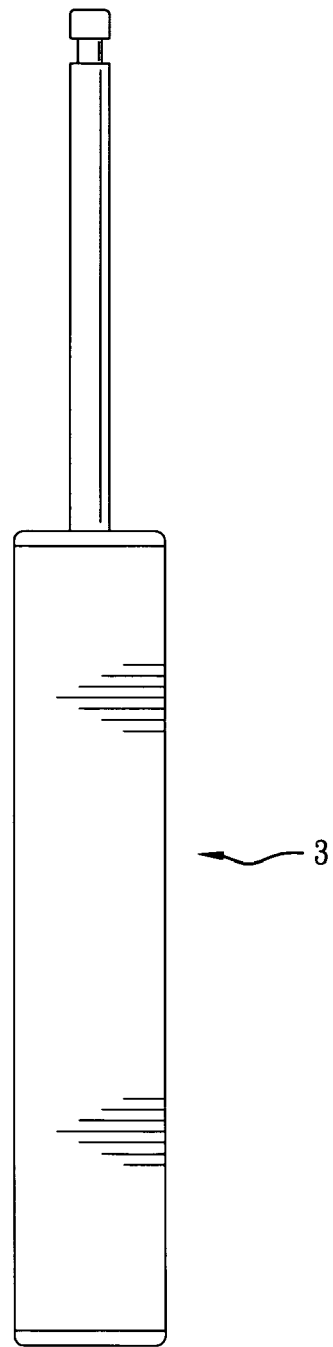
FIG. 1 is a plain view showing the extended status of a flow damper according to the prior art.
Figure 2:
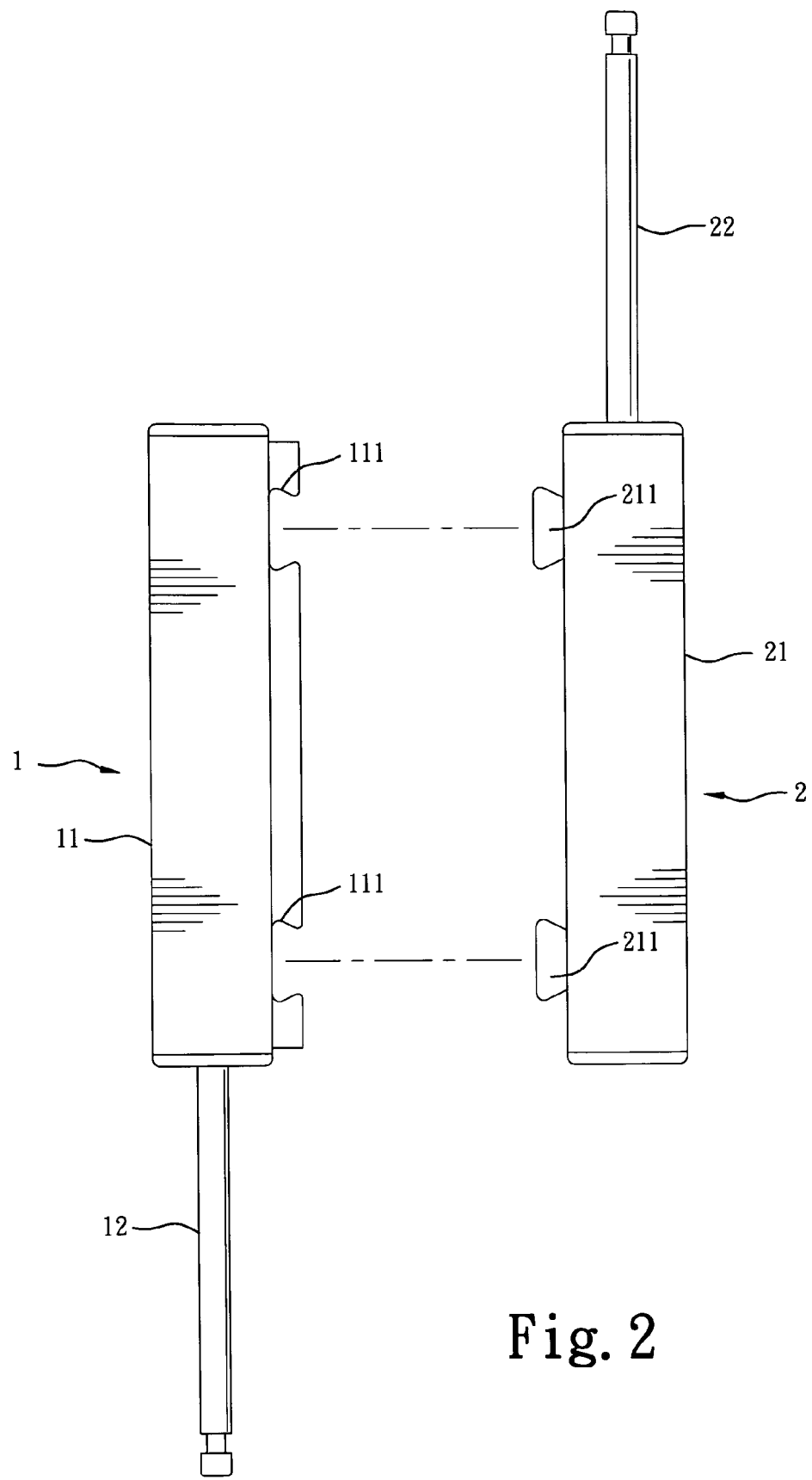
FIG. 2 is an exploded view of a flow damper in accordance with a first embodiment of the present invention.
Figure 3:
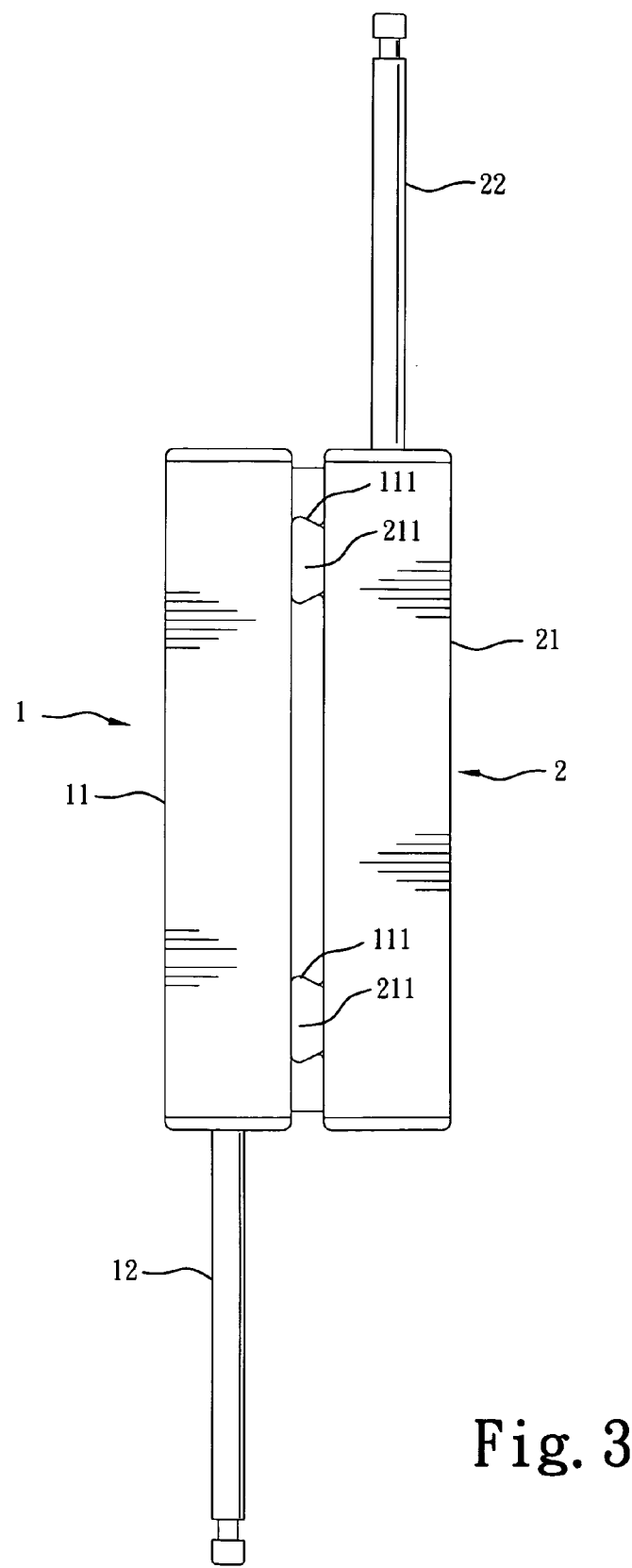
FIG. 3 illustrates the two flow cylinders of the flow damper of the first embodiment of the present invention connected in parallel in reversed directions.
Figure 4:
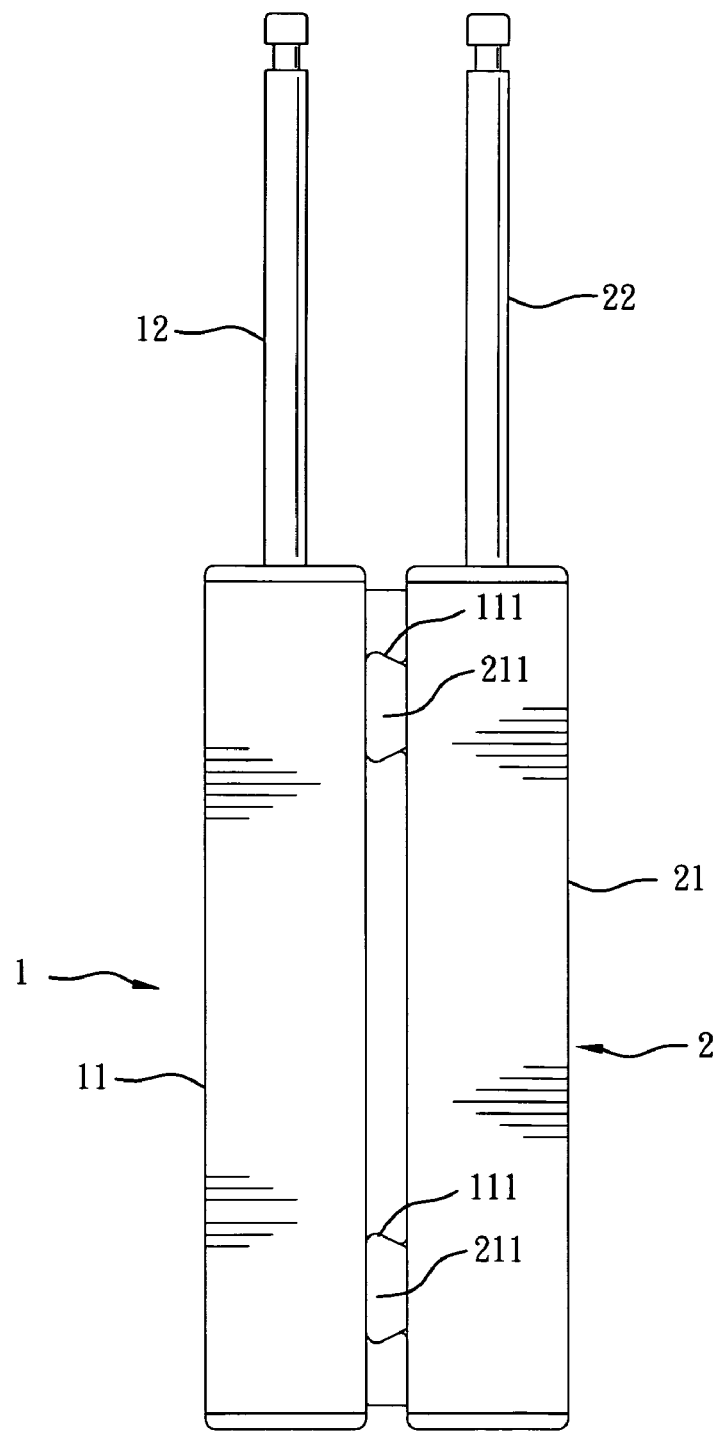
FIG. 4 illustrates the two flow cylinders of the flow damper of the first embodiment of the present invention connected in parallel in a same direction.
Figure 5:
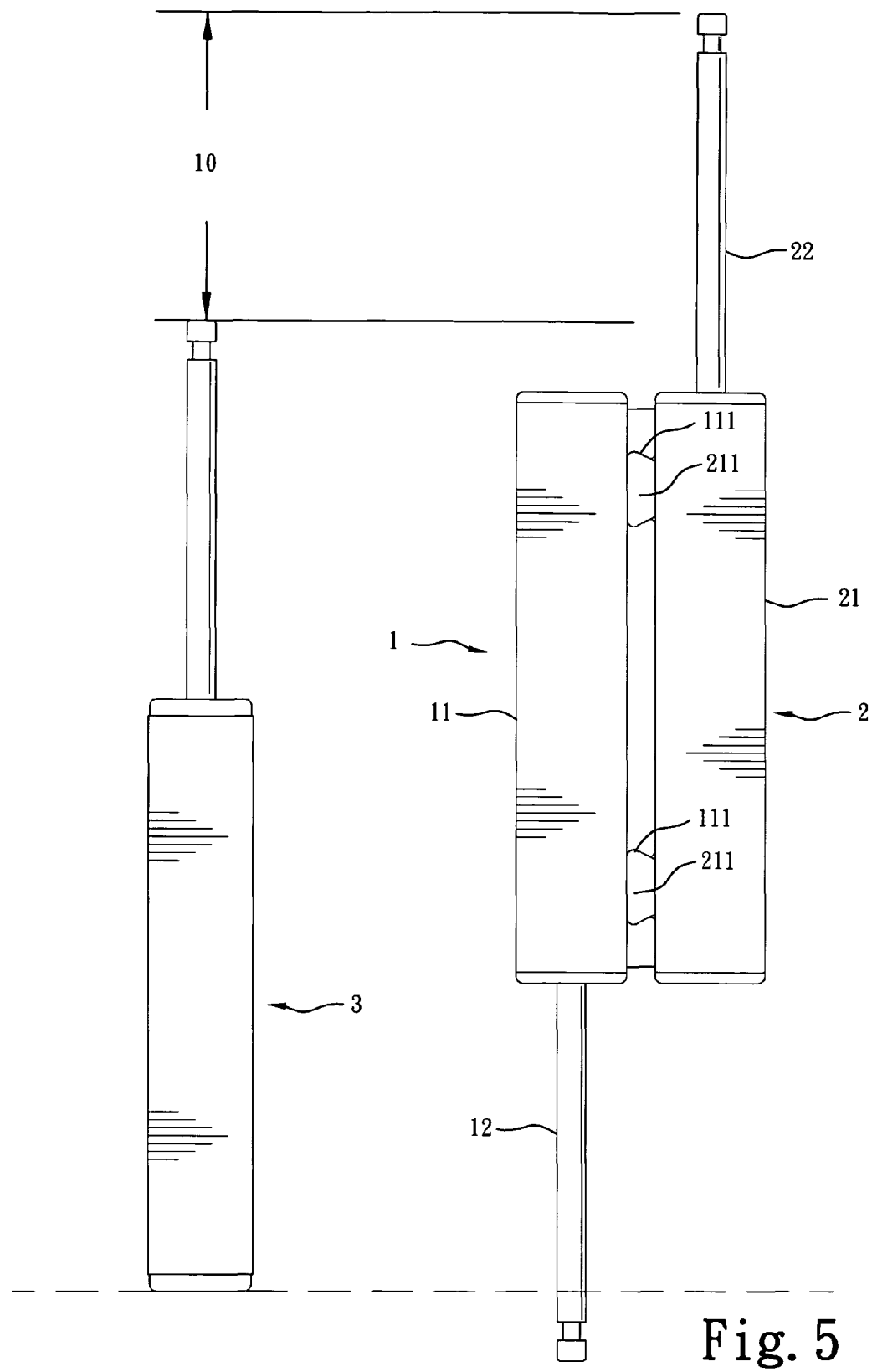
FIG. 5 is a schematic drawing showing the buffer stroke difference between the present invention and the prior art design.

The cylinder body 11 of the first flow cylinder 1 has a plurality of coupling grooves 111 arranged in a line at one lateral side. The cylinder body 21 of the second flow cylinder 2 has a plurality of coupling blocks 211 arranged in a line at one lateral side and respectively connectable to the coupling grooves 111 of the cylinder body 11 of the first flow cylinder 1. By means of connecting the respective coupling blocks 211 to the respective coupling grooves 111, the flow cylinders 1 and 2 can be fastened together in parallel in reversed directions (see FIG. 3), or in a same direction (see FIG. 4). When compared with the prior art flow damper 3, as shown in FIG. 5, the flow damper of the present invention provides a relatively greater buffer stroke, i.e., the flow damper of the present invention has an extra buffer stroke 10. When the piston rods 12 and 22 are received in the respective cylinder bodies 11 and 21, the length of the flow damper of the present invention is approximately equal to the prior art flow damper 3. Therefore, the invention does not require much installation space while providing a relatively longer buffer stroke. Further, because the two flow cylinders 1 and 2 can be fastened together in parallel either in reversed directions or in a same direction, the invention is practical for different applications to fit different requirements. Further, the coupling grooves 111 of the cylinder body 11 of the first flow cylinder 1 can be made having a circular, oval, polygonal, or elliptical configuration. The coupling blocks 211 of the cylinder body 21 of the second flow cylinder 2 fit the configuration of the coupling grooves 111 of the cylinder body 11 of the first flow cylinder 1. According to this embodiment, the coupling grooves 111 are dovetail grooves, and the coupling blocks 211 are dovetail tongues.

Figure 6:
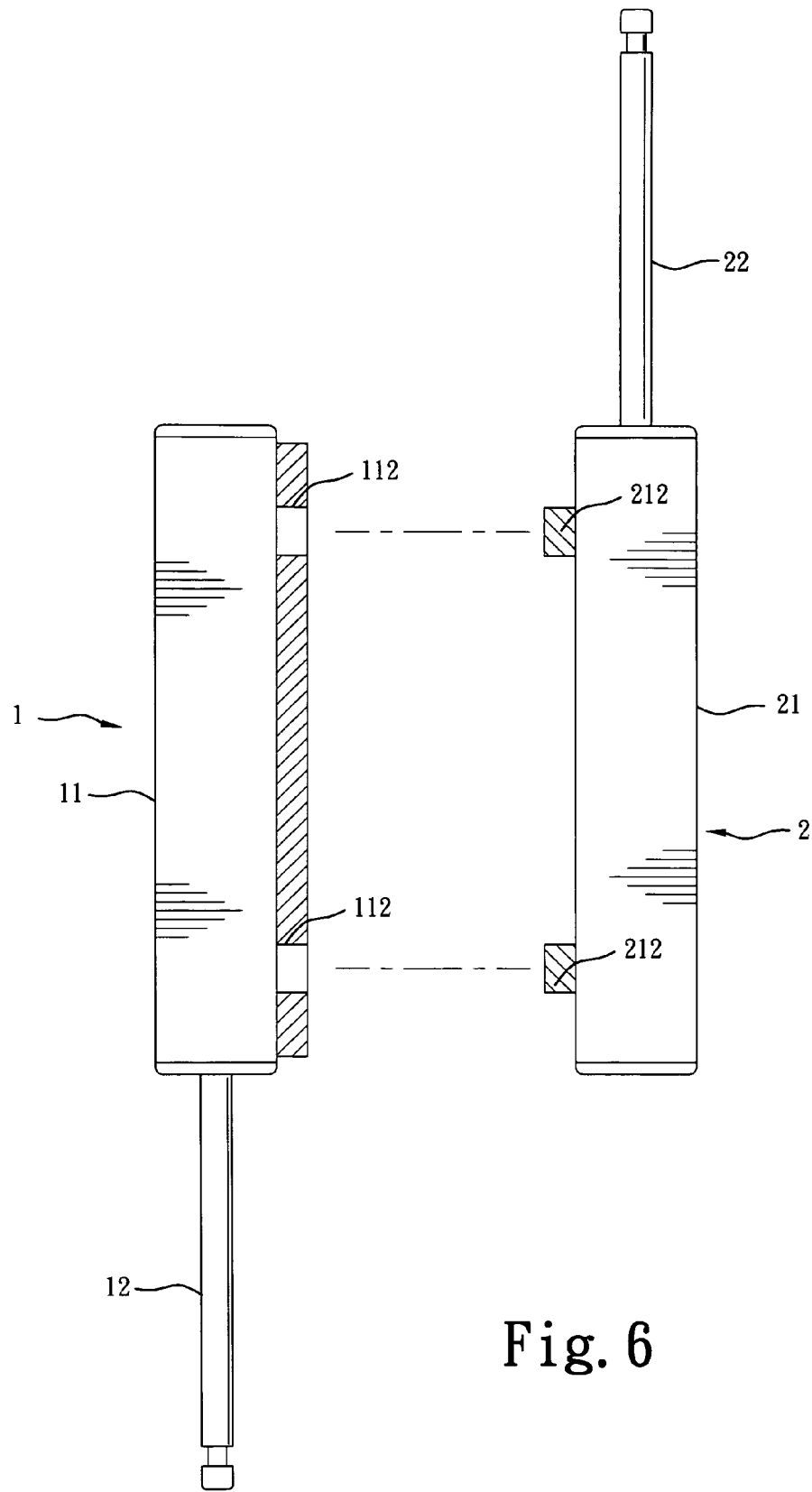
FIG. 6 is an exploded view of a flow damper in accordance with a second embodiment of the present invention.
Figure 7:
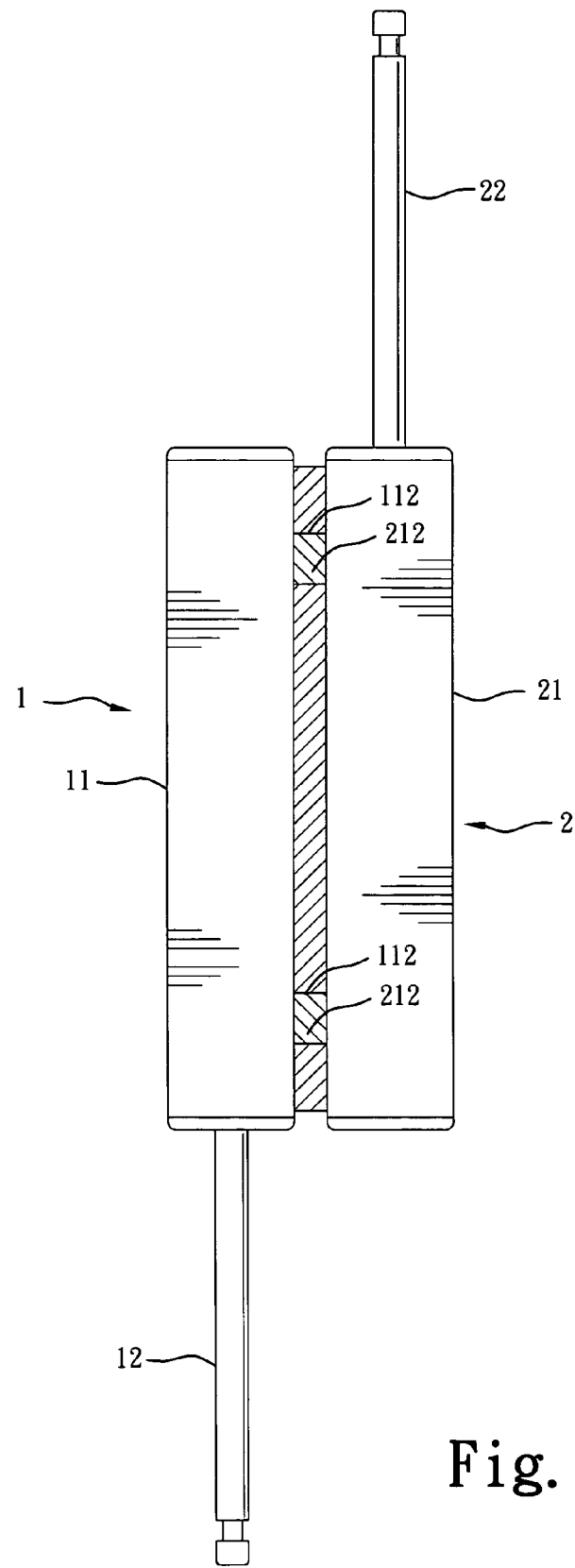
FIG. 7 illustrates the two flow cylinders of the flow damper of the second embodiment of the present invention connected in parallel in reversed directions.
Figure 8:
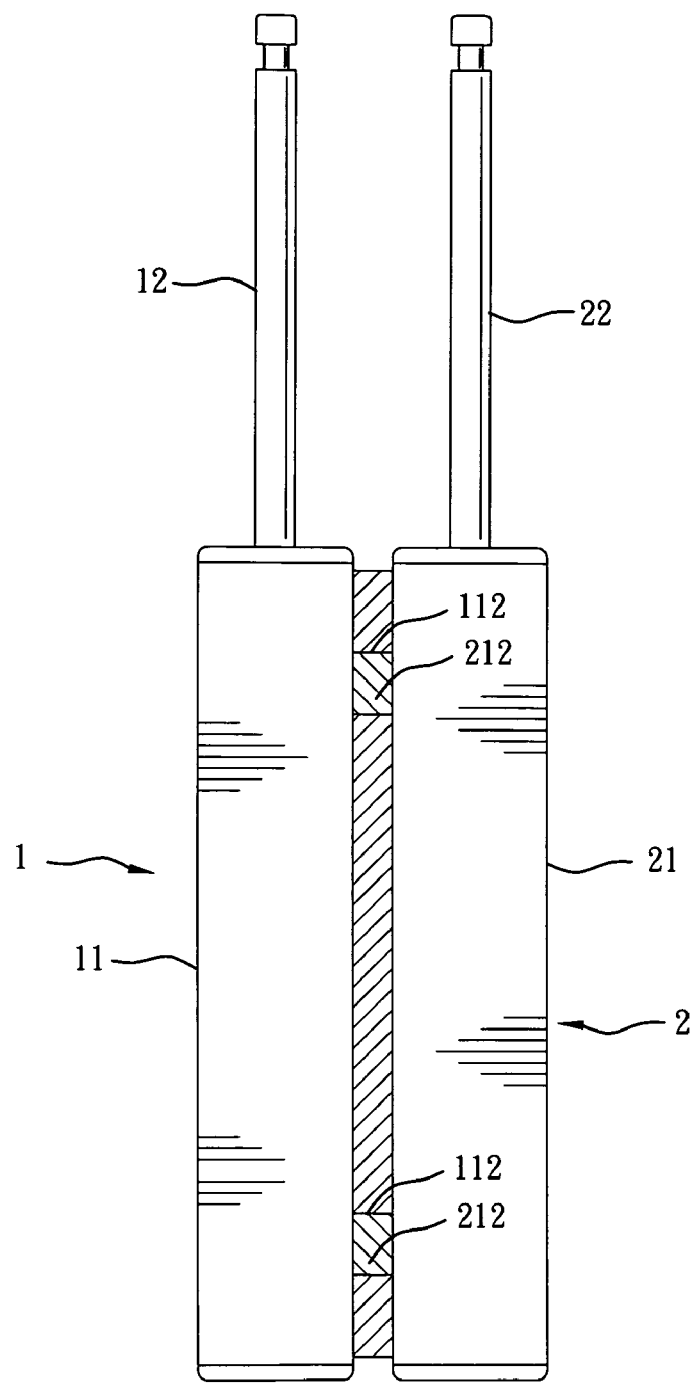
FIG. 8 illustrates the two flow cylinders of the flow damper of the second embodiment of the present invention connected in parallel in a same direction.

FIGS. 6~8 show a flow damper in accordance with a second embodiment of the present invention. This second embodiment is substantially similar to the aforesaid first embodiment with the exception that the cylinder body 11 of the first flow cylinder 1 has a plurality of plug holes 112 provided at one lateral side; the cylinder body 21 of the second flow cylinder 2 has a plurality of plug members 212 arranged at one lateral side and respectively engageable into the plug holes 112 of the cylinder body 11 of the first flow cylinder 1. By means of connecting the respective plug members 212 into the respective plug holes 112, the flow cylinders 1 and 2 can be fastened together in parallel in reversed directions (see FIG. 7), or in a same direction (see FIG. 8).

Figure 9:
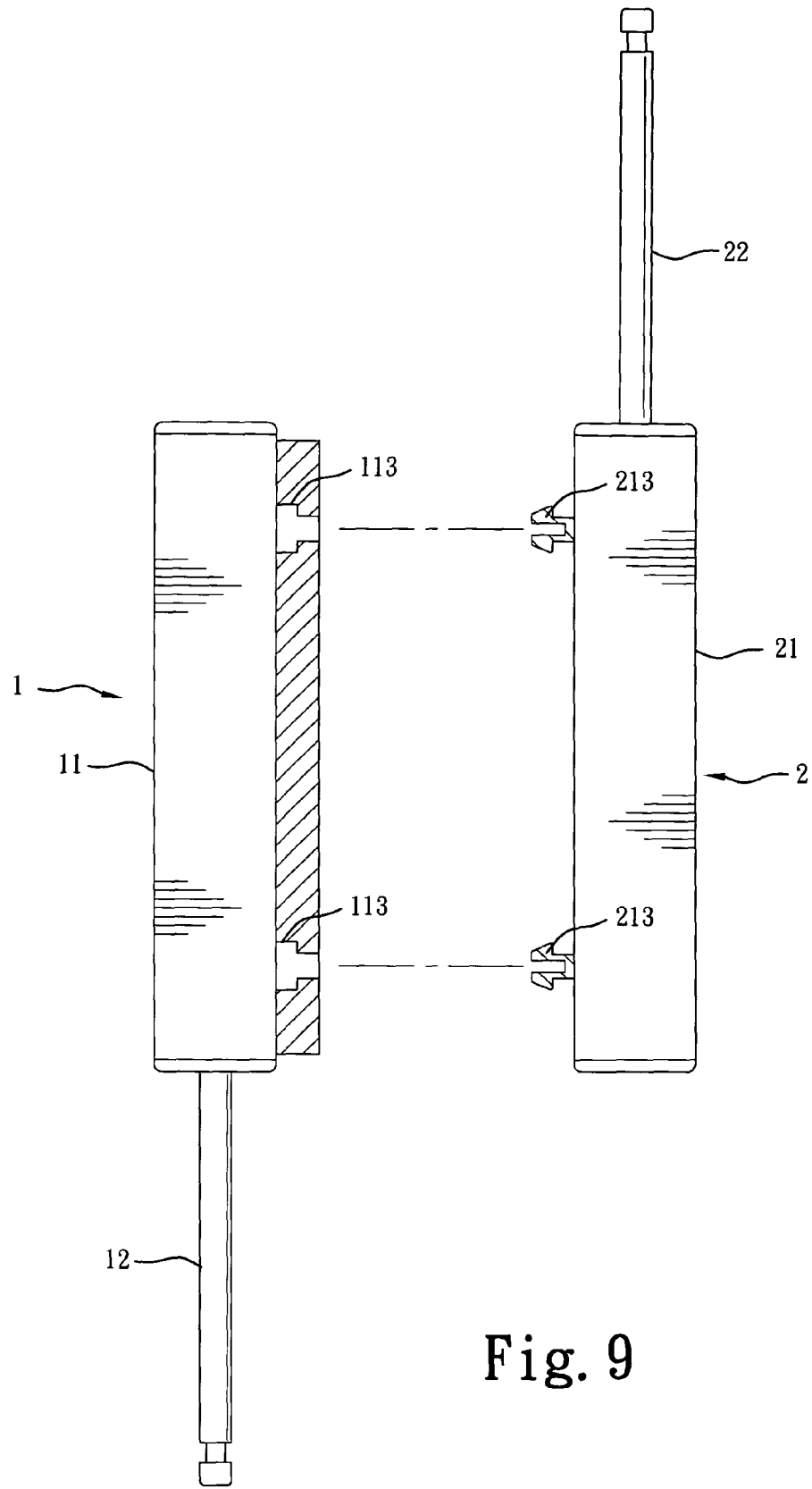
FIG. 9 is an exploded view of a flow damper in accordance with a third embodiment of the present invention.
Figure 10:
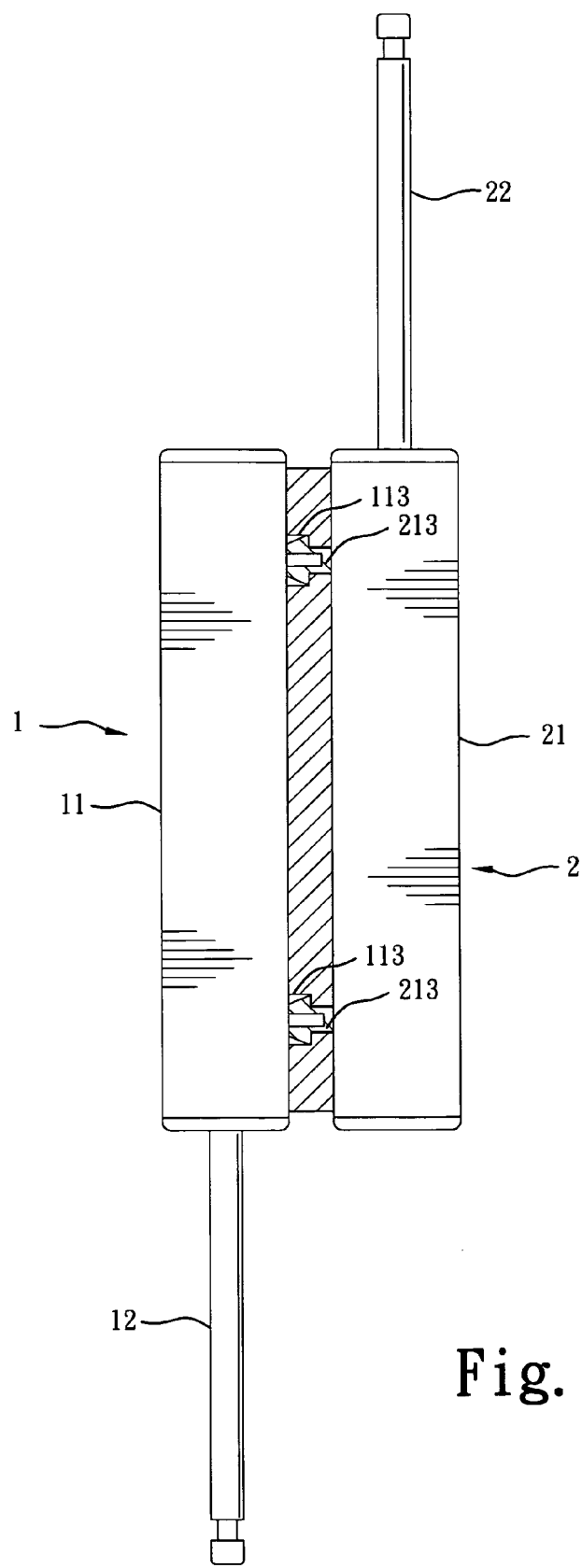
FIG. 10 illustrates the two flow cylinders of the flow damper of the third embodiment of the present invention connected in parallel in reversed directions.
Figure 11:
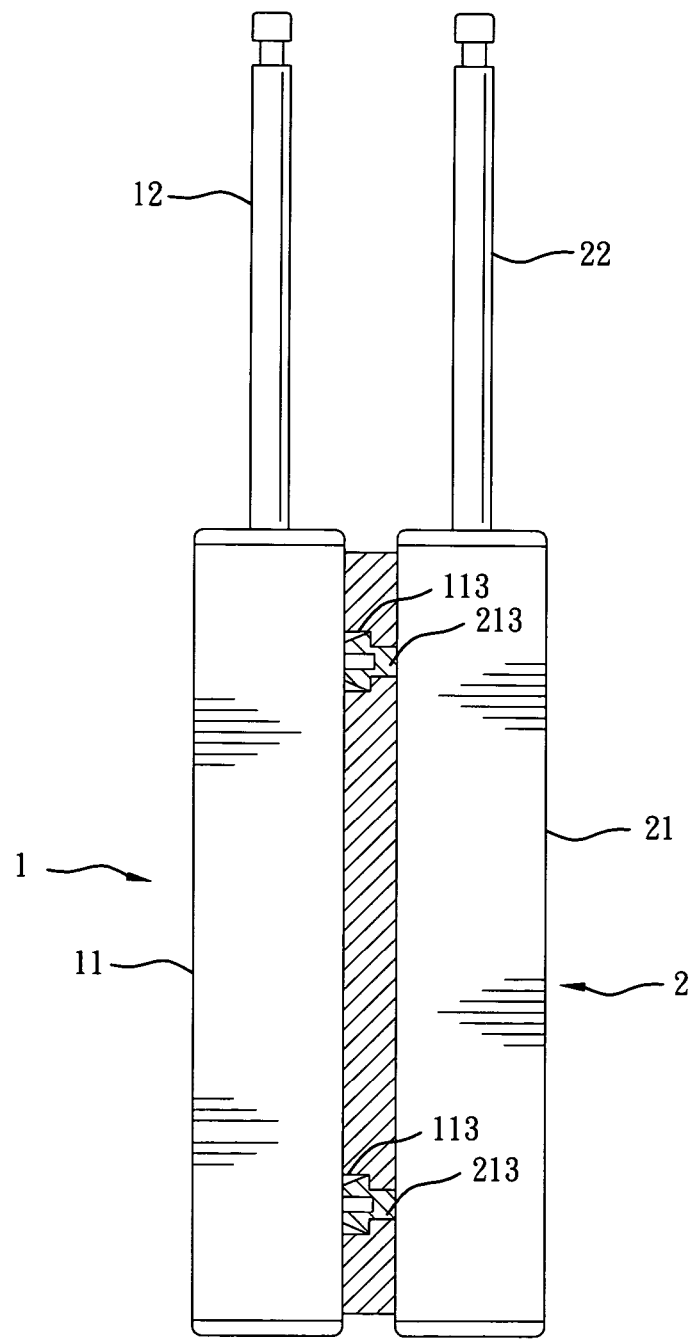
FIG. 11 illustrates the two flow cylinders of the flow damper of the third embodiment of the present invention connected in parallel in a same direction.
Figure 12:
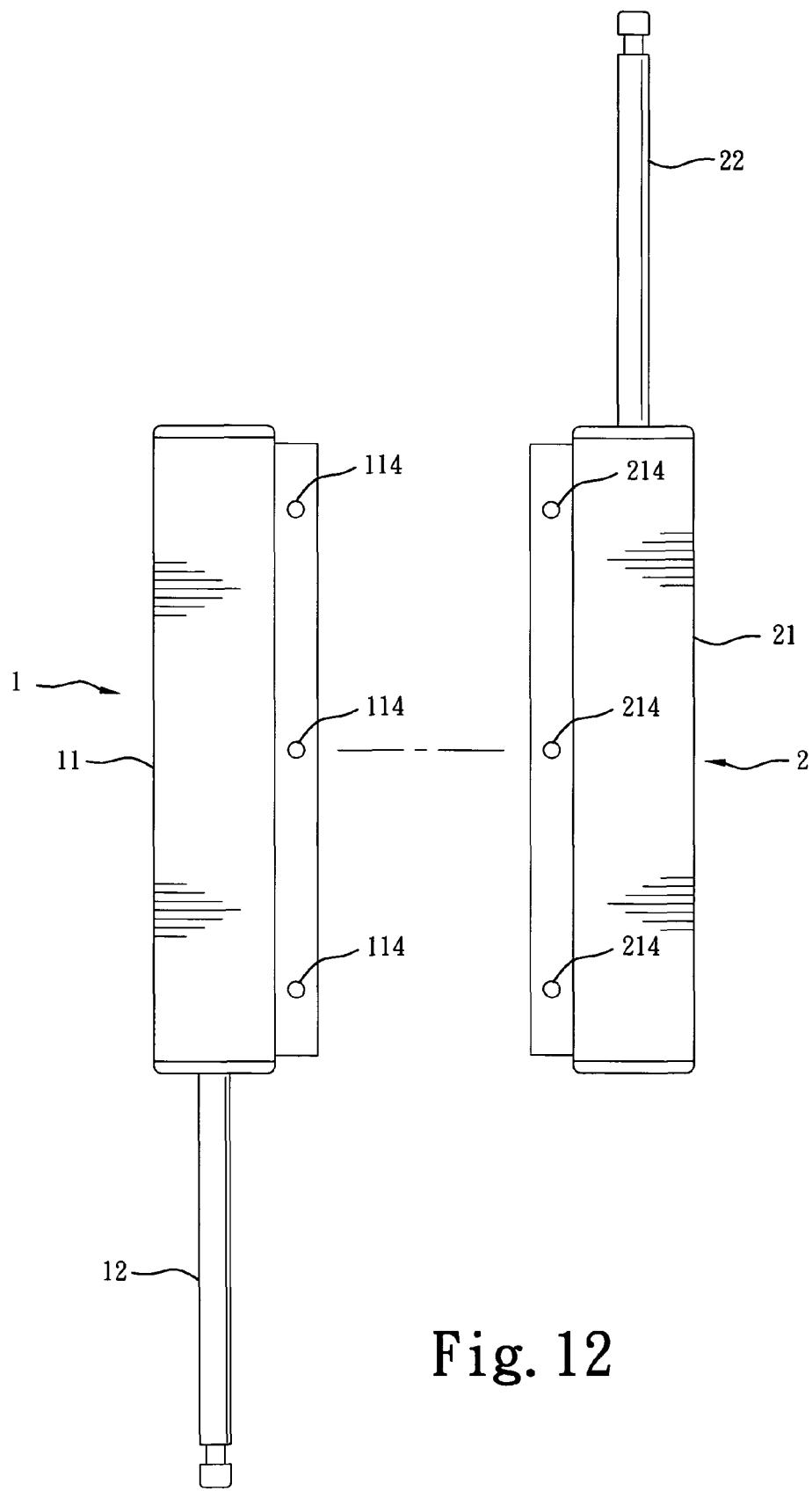
FIG. 12 is an exploded view of a flow damper in accordance with a fourth embodiment of the present invention.
Figure 13:
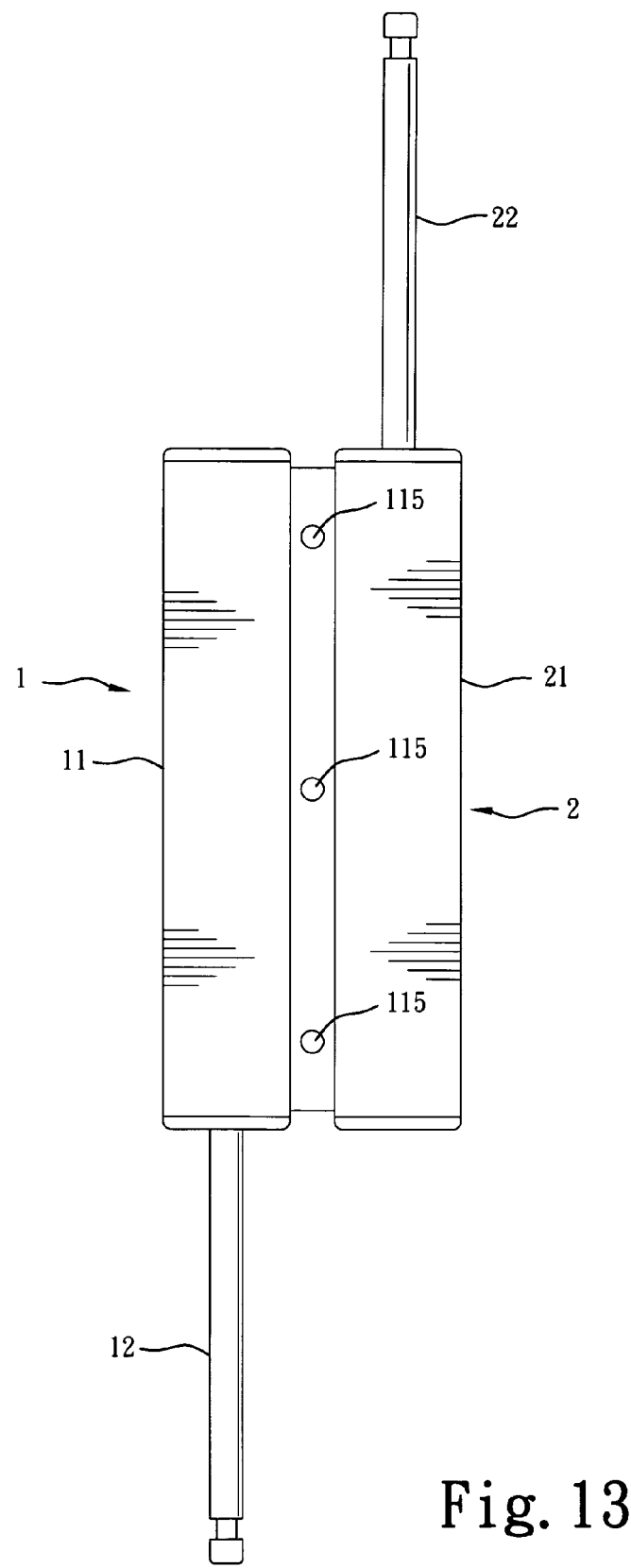
FIG. 13 is a front view illustrates the two flow cylinders of the flow damper of the fourth embodiment of the present invention connected in parallel in reversed directions.
Figure 14:
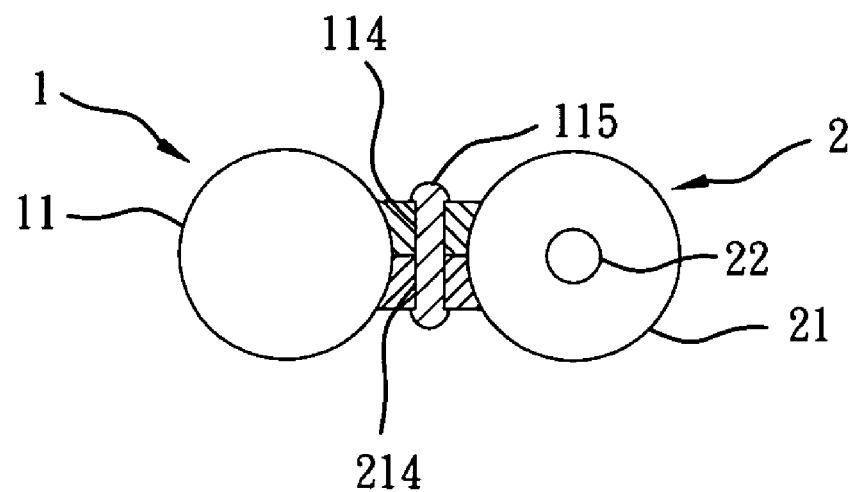
FIG. 14 illustrates the two flow cylinders of the flow damper of the fourth embodiment of the present invention connected in parallel in reversed directions.
Figure 15:
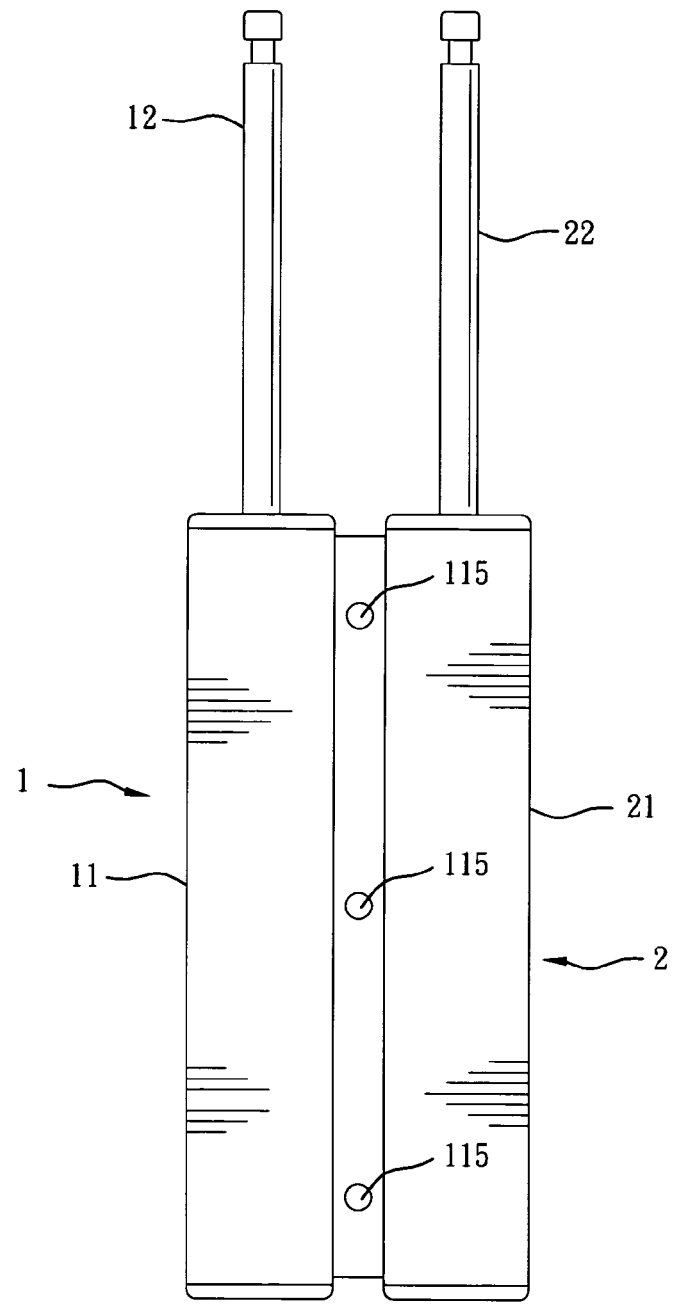
FIG. 15 illustrates the two flow cylinders of the flow damper of the fourth embodiment of the present invention connected in parallel in a same direction.

FIGS. 9~11 show a flow damper in accordance with a third embodiment of the present invention. This third embodiment is substantially similar to the aforesaid first embodiment with the exception that the cylinder body 11 of the first flow cylinder 1 has a plurality of retaining holes 113 provided at one lateral side; the cylinder body 21 of the second flow cylinder 2 has a plurality of split retaining bolts 213 arranged at one lateral side and respectively engageable into the retaining holes 113 of the cylinder body 11 of the first flow cylinder 1. By means of connecting the respective split retaining bolts 213 into the respective retaining holes 113, the flow cylinders 1 and 2 can be fastened together in parallel in reversed directions (see FIG. 10), or in a same direction (see FIG. 11).

FIGS. 12~15 show a flow damper in accordance with a fourth embodiment of the present invention. This fourth embodiment is substantially similar to the aforesaid first embodiment with the exception that the cylinder body 11 of the first flow cylinder 1 has a plurality of mounting through holes 114 provided at one lateral side; the cylinder body 21 of the second flow cylinder 2 has a plurality of mounting through holes 214 arranged at one lateral side corresponding to the mounting through holes 114 of the cylinder body 11 of the first flow cylinder 1. By means of fastening the mounting through holes 114 of the first flow cylinder 1 to the mounting through holes 214 of the second flow cylinder 2 with fastening members (screws or rivets) 115, the flow cylinders 1 and 2 are fastened together in parallel in reversed directions (see FIG. 13), or in a same direction (see FIG. 15).

As stated above, the invention provides a flow damper for drawer that has the following features and advantages:

1. The two flow cylinders 1 and 2 can be fastened together in parallel in reversed directions for use in a furniture to provide a relatively longer buffer stroke while does not require an extra installation space.

2. The two flow cylinders 1 and 2 can be fastened together in parallel in a same direction for use in a furniture to provide an enhanced buffer effect.

3. The two flow cylinders 1 and 2 can be fastened together in parallel in reversed directions or in a same direction for use in an auto-close mechanism of a sliding rail assembly for drawer, sliding door or any other furniture to fit different application requirements.

What is claimed is:

1. A flow damper used in an auto-close mechanism of a sliding rail assembly, comprising a first flow cylinder and a second flow cylinder, said first and second flow cylinders each having a cylinder body filled with a flow substance, a piston accommodated and axially slidable in said cylinder body, and a piston rod connected to said piston and extending out of one end of said cylinder body and being movable with said piston relative to said cylinder body, wherein:

the flow substance of the first flow cylinder is entirely independent of the flow substance of the second flow cylinder; and the cylinder body of said first flow cylinder has at least one coupling groove disposed at one lateral side thereof; the cylinder body of said second flow cylinder has at least one coupling block disposed at one lateral side thereof and respectively connectable to said at least one coupling groove of said first flow cylinder to secure said first flow cylinder and said second flow cylinder in parallel.

2. The flow damper as claimed in claim 1, wherein said at least one coupling groove has one of dovetailed, circular, polygonal, gourd shaped, elliptical configurations, and said at least one coupling block has one of dovetailed, circular, polygonal, gourd shaped, elliptical configurations that fits the configuration of said at least one coupling groove.

3. A flow damper used in an auto-close mechanism of a sliding rail assembly, comprising a first flow cylinder and a second flow cylinder, said first and second flow cylinders each having a cylinder body filled with a flow substance, a piston accommodated and axially slidable in said cylinder body, and a piston rod connected to said piston and extending out of one end of said cylinder body and being movable with said piston relative to said cylinder body, wherein:

the flow substance of the first flow cylinder is entirely independent of the flow substance of the second flow cylinder; and the cylinder body of said first flow cylinder has at least one plug hole disposed at one lateral side thereof; the cylinder body of said second flow cylinder has at least one plug member disposed at one lateral side thereof and respectively engageable into said at least one plug hole of said first flow cylinder to secure said first flow cylinder and said second flow cylinder in parallel.

4. The flow damper as claimed in claim 3, wherein said at least one plug hole has one of dovetailed, circular, polygonal, gourd shaped, elliptical configurations, and said at least one plug member has one of dovetailed, circular, polygonal, gourd shaped, elliptical configurations that fits the configuration of said at least one plug hole.

5. A flow damper used in an auto-close mechanism of a sliding rail assembly, comprising a first flow cylinder and a second flow cylinder, said first and second flow cylinders each having a cylinder body filled with a flow substance, a piston accommodated and axially slidable in said cylinder body, and a piston rod connected to said piston and extending out of one end of said cylinder body and being movable with said piston relative to said cylinder body, wherein:

the flow substance of the first flow cylinder is entirely independent of the flow substance of the second flow cylinder; and the cylinder body of said first flow cylinder has at least one retaining hole disposed at one lateral side thereof; the cylinder body of said second flow cylinder has at least one split retaining bolt disposed at one lateral side thereof and respectively connectable into said at least one retaining hole of said first flow cylinder to secure said first flow cylinder and said second flow cylinder in parallel.

6. A flow damper used in an auto-close mechanism of a sliding rail assembly, comprising a first flow cylinder and a second flow cylinder, said first and second flow cylinders each having a cylinder body filled with a flow substance, a piston accommodated and axially slidable in said cylinder body, and a piston rod connected to said piston and extending out of one end of said cylinder body and being movable with said piston relative to said cylinder body, wherein:

the piston flow substance of the first flow cylinder is entirely independent of the flow substance of the second flow cylinder; and the cylinder body of said first flow cylinder has at least a plurality of mounting through holes disposed at one lateral side thereof; the cylinder body of said second flow cylinder has a plurality of mounting through holes disposed at one lateral side thereof and respectively fastened to the mounting through holes of said first flow cylinder with respective fastening members to secure said first flow cylinder and said second flow cylinder in parallel.

* * * * *